(No Model.) 2 Sheets—Sheet 1.

E. P. SHAFFER.
OIL CUP.

No. 377,782. Patented Feb. 14, 1888.

Witnesses
H. G. Phillips.
C. G. Crannell

Inventor
Edward P. Shaffer.
By his Attorney
Geo. B. Selden (No Model.) 2 Sheets—Sheet 2.
E. P. SHAFFER.
OIL CUP.
No. 377,782. Patented Feb. 14, 1888.
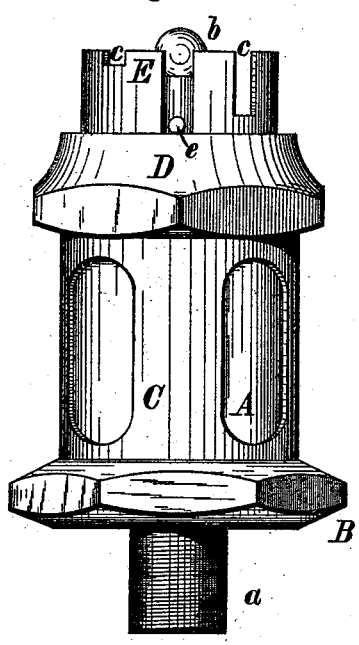
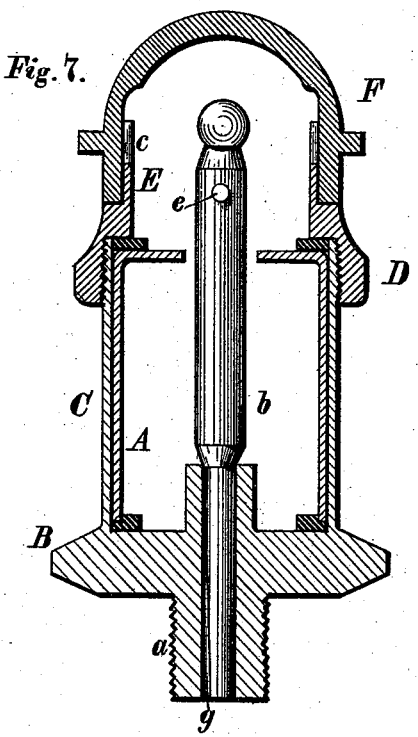
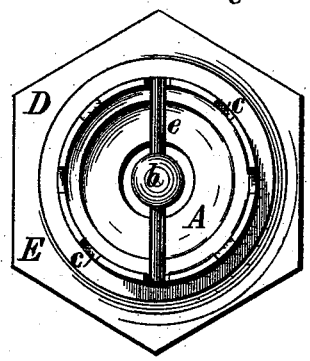
Witnesses
H. G. Phillips.
C. G. Crannell.
Inventor
Edward P. Shaffer.
By his Attorney
Geo. B. Selden

UNITED STATES PATENT OFFICE.

EDWARD P. SHAFFER, OF ROCHESTER, NEW YORK.

OIL-CUP.

SPECIFICATION forming part of Letters Patent No. 377,782, dated February 14, 1888.

Application filed May 31, 1887. Serial No. 239,833. (No model.)

*To all whom it may concern:*

Be it known that I, EDWARD P. SHAFFER, of Rochester, Monroe county, New York, have invented certain new and useful Improvements in Oil-Cups, of which the following is a specification, reference being had to the accompanying drawings.

My invention relates to an improved means of graduating and regulating the feed of lubricator from an oil-cup and in certain details of the construction.

My invention is fully described and illustrated in the following specification and accompanying drawings, the novel features thereof being pointed out in the claims annexed to the said specification.

My improvements in oil-cups are represented in the accompanying drawings, in which—

Figure 1:
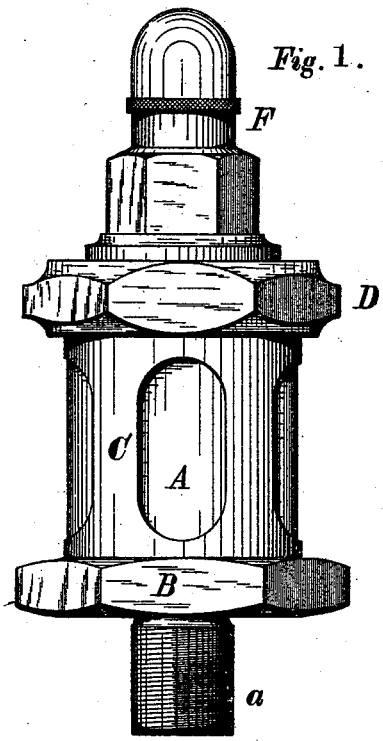
Figure 2:
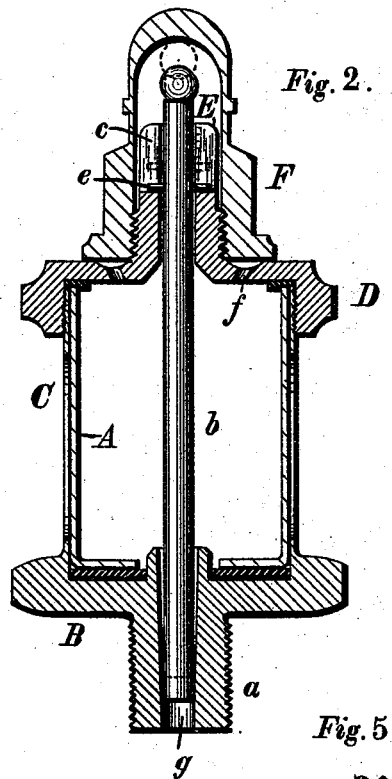
Figure 3:
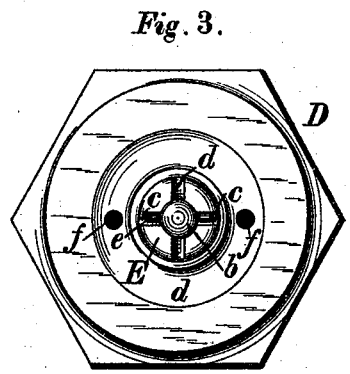
Figures 4, 5:
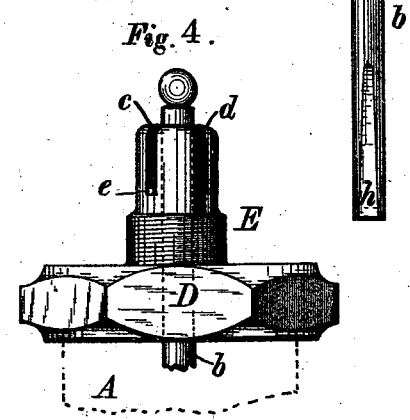

Figure 1 is an elevation of an oil-cup designed for use on moving parts, such as the crank end of connecting-rods, &c. Fig. 2 is a central vertical section of the same. Fig. 3 is a plan view, the cap being removed. Fig. 4 is an elevation of the cover. Fig. 5 represents a modification of the plunger. Fig. 6 represents a modified form of cup. Fig. 7 is a vertical section of the same. Fig. 8 is a plan view.

My improved oil-cup is represented in the accompanying drawings, in which—

A is the glass cylinder or cup, and B is the base, which is provided with a hollow threaded boss or stem, $a$, for attachment to the part which is to be lubricated. On the upper part of the base a cage, C, is formed, within which the cylinder A is placed, the openings in the cage allowing the interior of the cup to be inspected through the glass. The upper portion of the cage C is threaded, and the cover D screws thereon, clamping the glass cylinder A between it and the base.

Suitable packing may be interposed between the glass and the cover and the glass and the base to preserve the glass from injury and to prevent leakage of the oil. The edges of the cover and base are preferably formed square or hexagon, so as to admit the use of a wrench. An annular flange or boss, E, projects upward from the cover D and receives the cap F. The plunger $b$ passes through the cup, being supported by the pin $e$, which passes through the upper part of the plunger and rests on the edges of the annular projection E of the cover. The rod or plunger $b$ extends through the oil-receptacle and enters the outlet-passage $g$, serving, when in its lowest position, to cut off the flow of oil from the cup.

The outlet-passage $g$ may be formed tapering, as indicated in Fig. 2; or the side of the plunger $b$ may be cut away on a taper, as shown at $h$ in Figs. 5 and 7, so that when the rod is slightly raised a passage is formed, through which a certain amount of oil may flow out of the cup, and when the rod is raised still farther a larger amount of oil will be discharged in a given time.

A series of notches, $c\ d$, of varying depth are cut in projection E, in which the pin $e$ rests, so as to sustain the rod $b$ in various positions, and the operator may readily change the rate of feed from the cup by lifting the pin out of one slot and dropping it in another.

When my improved oil-cup is to be attached to a moving part—as, for instance, the crank or connecting-rod of an engine—I prefer to use the form shown in Figs. 1 and 2, and although that shown in Figs. 6 and 7 is especially applicable to stationary parts it may be used to good advantage on comparatively slowly-rotating parts, the weight of the cover being depended upon to hold it in place; or the cover may be fitted tightly to the boss or ring E and held thereon by friction. The plunger $b$ is thrown upward and downward by the motion of the machine when it is attached to a moving part, and the cap F limits its motion upward, while the length of its stroke is gaged by the depth of the slot in which the pin $e$ is traveling. When the cup is attached to a stationary part, the oil flows out by gravity, a small hole being formed through the cap, if necessary, to allow air to enter the cup. Filling-holes $f\ f$ may be provided, which are covered by a flange on the screw-cap, when the form shown in Fig. 2 is used.

The operation of changing the rate of feed from my oil-cup is rendered very easy, it being only necessary to remove the cap F, when the rod $b$ may be readily changed from one slot to another, its end for this purpose being conveniently formed into a knob or handle. The cylindrical boss or ring E is made of such a height that the pin $e$ cannot escape from the slots.

It is obvious that the glass cylinder A may be dispensed with, a metallic cylinder being formed on the base in place of the cage C.

My invention can be applied to many oil-cups now in use. One of the principal advantages of my invention, in addition to the regulation of the amount of oil fed, is that the flow of oil can be entirely cut off at any time when desired by placing the pin e in the deepest slot, and thereby waste of oil when the machine is at rest prevented.

I claim—

1. The combination, with the oil-cup having the upwardly-projecting annular boss or ring with slots of varying depth in its upper edge, of a rod or plunger extending through the cup and into the outlet-passage, provided with the pin or projection thereon resting in the said slots, and the removable cap or cover for limiting the upward movement of the rod or plunger, substantially as described.

2. The combination, with an oil-cup having the upwardly-projecting annular boss or ring with slots of varying depth in its upper edge, of a rod or plunger extending through the cup and into the outlet-passage, provided with the pin or projection resting in the said slots, and the flat tapering surface h within the outlet-passage, substantially as described.

E. P. SHAFFER.

Witnesses:
BENJ. R. CATLIN,
GEO. B. SELDEN.